Sept. 6, 1932.  R. W. REGENSBURGER  1,875,496

EGG BREAKING AND PACKING TABLE

Filed March 2, 1931

Richard W. Regensburger
INVENTOR

BY
ATTORNEY

Witness—

Patented Sept. 6, 1932

1,875,496

UNITED STATES PATENT OFFICE

RICHARD W. REGENSBURGER, OF CHICAGO, ILLINOIS, ASSIGNOR, BY MESNE ASSIGNMENTS, TO INDUSTRIAL PATENTS CORPORATION, OF CHICAGO, ILLINOIS, A CORPORATION OF DELAWARE

EGG BREAKING AND PACKING TABLE

Application filed March 2, 1931. Serial No. 519,658.

My invention relates more particularly to means for packing the entire contents of eggs without the separation of the white and the yolk. One of the objects of my invention is to provide an economical means for packing the contents of the eggs without separation. Other objects of my invention will be apparent from the description which follows. It will be understood that while my invention is concerned chiefly with the packing of the unseparated contents of eggs it may be used as will be seen in connection with the separating devices.

Referring now to the drawing which accompanies this specification, and is made a part hereof, and in which similar characters of reference refer to similar parts in the several figures.

Figure 1:
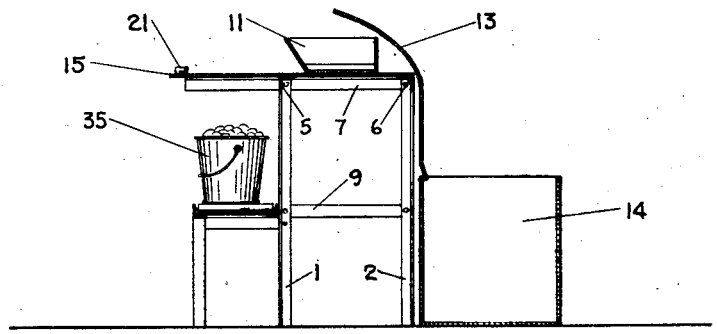
Figure 1 is a cross-section through a particular embodiment of my device.

A suitable angle iron frame is provided, consisting of legs 1, 2, 3 and 4, side angles 5 and 6, end angles 7 and 8, and braces 9 and 10. A trough 11 is placed upon the top of the frame, or work bench as the structure as a whole may be arbitrarily termed. The trough is provided with a discharge spout 12. Trough 11 is protected by hood 13 from egg shells which are cast rearwardly over the hood by the operator into a box as 14 behind the work bench. It will be noted that the hood 13 may be described as a longitudinal hood extending the full length of the work bench and which hood also extends upwardly and forwardly from the rear region of the work bench over a substantial portion of the trough. A plurality of egg breaking stations is provided on the front or open side of the work bench. At each egg breaker's station will be noted a plate as 15, 16, 17, 18, 19 and 20, each plate being provided with an egg breaking knife as 21, 22, 23, 24, 25 and 26. It will be observed that the several plates 15, 16, 17, 18, 19 and 20 in fact are longitudinally arranged spaced shelves that project from the upper front portion of the work bench. Running underneath the egg breaker's plate or platform is a roller conveyor which is shown as consisting of side angles 27 and 28, end angles 29 and 30, and a plurality of rollers as 31, rotably mounted in appropriate bearings in side angles 27 and 28, the whole comprising conveyor 32, which is supported by legs 1 and 3 and legs 33 and 34. Conveyor 32 is higher at the end 29 than it is at the end 30, and consequently pails or other containers full of whole eggs as pail 35 will slide gently down to end 30. The spaces provided between the several plates or shelves 15, 16, etc. provide openings that facilitate access to the eggs in the receptacles or containers immediately under the spaces. As pails become empty they are removed, permitting full pails to slide up into place, the pails being fed from end 29. When whole eggs are broken out the operator breaks the eggs into appropriate cups for visual and olfactory inspection; the cups being dumped after inspection into trough 11, permitting the egg contents to flow down through spout 12 into a storage receptacle as 36. I have shown receptacle 36 upon a roller conveyor 37 which consists of side angles 38 and 39, rigidly mounted to brace 10 and provided with end angle 40. A plurality of rollers as 31 being rotably mounted and suitable bearings on side angles 38 and 39. End 40 of conveyor 37 is supported by legs 41 and 42 and is lower than the end at brace 10.

Figure 2:
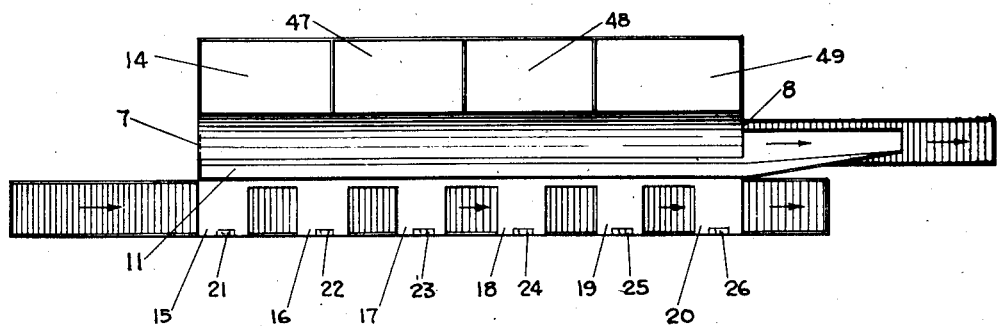
Figure 2 is a plan view of the device shown in Figure 1.
Figure 3:
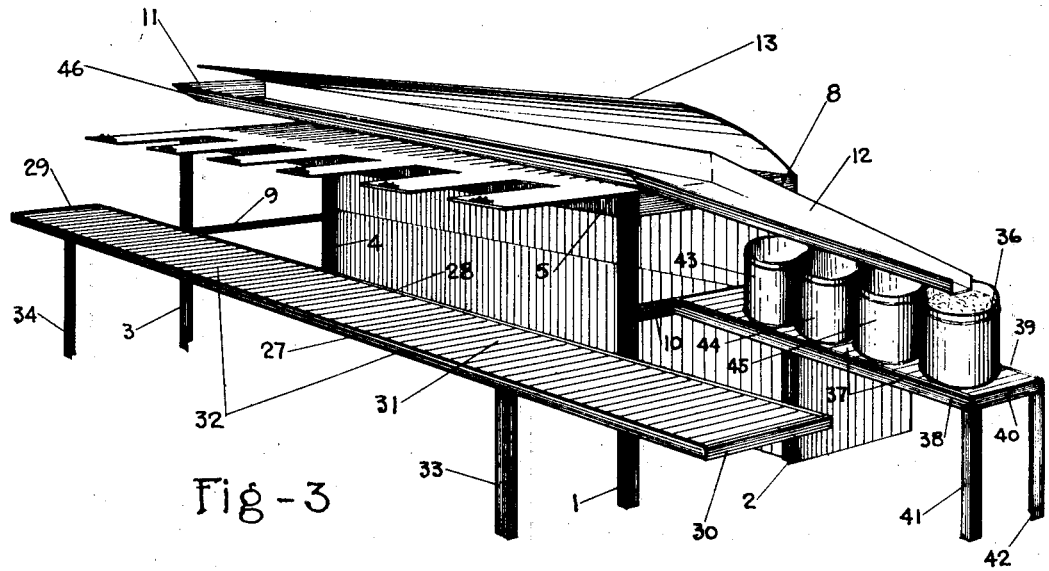
Figure 3 is a perspective view of the device shown in Figures 1 and 2.

Empty cans or containers as 43, 44 and 45 may be placed on conveyor 37 and slide down by gravity on rollers of conveyor 37 when a full can as 36 is removed from the discharge end of spout 12. For convenience in removing egg shells and I show in Figure 2 a plurality of such receptacles as 14, 47, 48 and 49. Where it is desired a separating device may be placed at the end of spout 12 to separate the whites from the yolks of the eggs received from trough 11. At this point it might be noted that trough 11 is tilted with the closed end 46 higher than the spout end in order that fluid content may flow to the discharge end by gravity. Carrying out my method I prefer to have the egg breakers break eggs into a number of cups held in the trays in order that a number of eggs may be submitted to individual and olfactory inspection in substantially one operation by merely glancing at the contents of the several cups and passing them with one motion under the nose for smelling. I prefer to use for this purpose the type of cup rack described and claimed in my co-pending application entitled "Egg packing", filed March 2, 1931, Serial Number 519,660.

It is to be understood that changes may be made in the construction of the device shown in the drawing and described herein, and the method of using such a device without departing from the spirit of my invention as defined in the following claims.

I claim:

1. A work bench of the class described comprising a longitudinally extending frame work, a plurality of spaced longitudinally arranged egg breaking stations, each such station being provided with an egg breaking device mounted on a shelf carried by and projecting forwardly from the upper front portion of the frame work, a longitudinally extending conveyor located below said shelves and accessible to said egg breaking stations for the cartage of containers of whole eggs, a longitudinally extending trough located at the top of the frame work to receive the contents of the eggs, a forwardly and upwardly projecting hood that extends longitudinally over a portion of the trough, and a support or conveyor adapted to hold receptacles to be individually filled by receiving such egg contents from the discharge end of said trough.

2. A work bench of the class described comprising a longitudinally extending frame work, a plurality of spaced longitudinally arranged egg breaking stations, each station being provided with an egg breaking device mounted on a shelf which is carried by and projects forwardly from the upper portion of the frame work and a longitudinally extending conveyor or receptacle support located below said shelves and accessible to said egg breaking stations for the support of receptacles containing whole eggs, and a longitudinally extending trough located at the top of the work bench to receive the contents of the eggs.

3. A work bench as described in the claim last preceding which is provided with a longitudinally extending hood that projects forwardly and upwardly from the rear section of the work bench to a position over a substantial portion of the trough.

Signed at Chicago, Illinois, this 27th day of February, 1931.

RICHARD W. REGENSBURGER.